United States Patent
Brandt et al.

(10) Patent No.: US 8,671,898 B2
(45) Date of Patent: Mar. 18, 2014

(54) METHOD AND DEVICE FOR OPERATING AN INTERNAL COMBUSTION ENGINE

(75) Inventors: Martin Brandt, Sachsenheim (DE); Perry Betzler, Schwaebisch Hall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/587,272

(22) Filed: Aug. 16, 2012

(65) Prior Publication Data
US 2013/0042827 A1    Feb. 21, 2013

(30) Foreign Application Priority Data

Aug. 17, 2011   (DE) .......................... 10 2011 081 150

(51) Int. Cl.
*F02B 25/00*    (2006.01)

(52) U.S. Cl.
USPC ............. 123/76; 123/315; 123/43; 123/90.15

(58) Field of Classification Search
USPC ............... 123/294, 315, 76, 321, 432, 559.1, 123/559.2, 90.15–90.18
See application file for complete search history.

(56) References Cited

U.S. PATENT DOCUMENTS

| 4,068,630 | A * | 1/1978 | Bennett et al. | 123/315 |
| 7,819,100 | B2 * | 10/2010 | Canino et al. | 123/90.48 |
| 8,479,511 | B2 * | 7/2013 | Pursifull et al. | 60/605.2 |
| 2002/0043243 | A1 * | 4/2002 | Majima | 123/399 |
| 2004/0089250 | A1 * | 5/2004 | Iwashita et al. | 123/21 |
| 2005/0138928 | A1 * | 6/2005 | Pagot et al. | 60/605.1 |
| 2008/0149055 | A1 * | 6/2008 | Canino et al. | 123/90.12 |
| 2009/0217905 | A1 * | 9/2009 | Tanaka et al. | 123/276 |
| 2010/0242471 | A1 * | 9/2010 | Tomoda et al. | 60/602 |
| 2011/0219767 | A1 * | 9/2011 | Miyashita | 60/600 |

* cited by examiner

*Primary Examiner* — Erick Solis
(74) *Attorney, Agent, or Firm* — Kenyon & Kenyon LLP

(57) ABSTRACT

In a method for operating an internal combustion engine having at least one cylinder which includes a first exhaust valve and a second exhaust valve, the internal combustion engine is operated in a scavenging operating mode in that the closing times of the exhaust valves after an ejection stroke of a four-stroke operating cycle are situated after an opening time of an intake valve, and the second exhaust valve is opened with a time delay relative to the first exhaust valve in the scavenging operating mode.

10 Claims, 3 Drawing Sheets

METHOD AND DEVICE FOR OPERATING AN INTERNAL COMBUSTION ENGINE

BACKGROUND OF THE INVENTION

1. Field of the Invention

The present invention relates to internal combustion engines, in particular to internal combustion engines that can be operated in a scavenging operating mode.

2. Description of the Related Art

In order to improve engine efficiency in partial load operation, the displacement of internal combustion engines is continually being reduced. The loss of power connected therewith is compensated by providing charge devices that provide fresh air to the internal combustion engine under increased charge pressure. In particular when exhaust gas turbochargers are used as charging devices, deficits result during the rapid buildup of load required to ensure a good torque characteristic of the vehicle for rapid accelerations. These disadvantages can be compensated by a scavenging operating mode in which fresh air is flushed through the cylinders through a valve overlap of the opening phase of the intake valves and the opening phase of the exhaust valves. This results in a higher engine torque and a better operating point of the exhaust gas turbocharger, by increasing the conveyed mass flow.

BRIEF SUMMARY OF THE INVENTION

The present invention provides a method for operating an internal combustion engine in scavenging operating mode, as well as an engine system configured to implement the method.

According to a first aspect of the present invention, a method is provided for operating an internal combustion engine having at least one cylinder, the cylinder having a first and a second exhaust valve and the internal combustion engine being capable of being operated in scavenging operating mode in that the closing times of the exhaust valves, after an exhaust stroke of a four-stroke operating cycle, are situated after an opening time of an intake valve, such that in scavenging mode the second exhaust valve is opened with a temporal delay relative to the first exhaust valve.

The scavenging operating mode can improve the non-stationary and stationary performance of the charge device in that the air charge into the cylinders of the internal combustion engine, i.e. the fresh air mass flow conveyed through the cylinders, is increased, so that the transient load buildup is accelerated, or the stationary end value of the engine torque is increased. The degree of scavenging, which is determined by the fresh air mass conveyed through the cylinders, is limited at the exhaust side by, among other things, a catalytic converter situated there. On the one hand, the conversion in the catalytic converter can take place only within a limited lambda range, and on the other hand the maximum catalytic converter exothermy is limited.

In order nonetheless to realize a rapid load buildup using a scavenging operating mode, as much as possible of the residual energy present in the exhaust gas must be converted by a turbine of the exhaust gas turbocharger. For this purpose, post-reactions must take place in the exhaust gas before the turbine of the exhaust gas turbocharger, so that the temperature of the exhaust gas there increases and the turbine power can be increased.

A necessary presupposition for the occurrence of the post-reactions before the turbine of the exhaust gas turbocharger is a mixing of the sub-stoichiometric (rich) exhaust gas with the fresh air. The more homogenous this mixture is, the greater the releasable energy before or in the turbine.

Analyses have shown that, depending on the design of the exhaust manifold, the mixing can take place in the exhaust tract between the exhaust valves of the cylinders up to the turbine of the charge device, mainly taking place immediately before, in, and after the turbine. The increase in the exhaust gas enthalpy that this causes is however usable for the charging only if this can be converted before or in the exhaust gas turbocharger.

The above method makes it possible to improve the mixing process upstream from the turbine, so that the post-reaction takes place earlier. Through the offset operation of the exhaust valves of a cylinder, the fresh air of one of the partial exhaust ducts, conveyed into the partial exhaust ducts by the scavenging operation, is first conveyed in the direction of the turbine, and subsequently, after a part of the combustion exhaust gas that was conveyed through the first-opened exhaust valve and through the partial exhaust duct into the common exhaust duct, a further exhaust valve is opened in order to convey the fresh air column of the further partial exhaust duct into the common exhaust duct. This improves the homogenization of fresh air and exhaust gas in the common exhaust duct, and post-reactions in the exhaust tract of the internal combustion engine can take place earlier before reaching the turbine of the charge device. This enables a higher turbine power because the convertible exhaust gas enthalpy in the turbine is greater.

Through the above method, in general the use of exhaust gas enthalpy in scavenging operating mode is increased by exhaust gas post-reactions in that the mixing of rich exhaust gas, i.e. a combustion exhaust gas having an uncombusted fuel portion, with fresh air is improved and is realized closer to the engine. In this way, there result greater degrees of freedom for the scavenging operating mode, and smaller dimensions of the internal combustion engine are made possible. In this way, reductions in consumption and a reduction of $CO_2$ emissions can be realized.

In particular, it can be determined that due to the necessary manifold design given numbers of cylinders that require an ignition spacing of 180° crankshaft within a cylinder bank, the mixing before reaching the turbine of the charge device becomes less. Because the above method for operating the internal combustion engine in order to improve the homogenization in the exhaust tract is independent of the number of cylinders of the internal combustion engine, the proposed method is particularly efficient in internal combustion engines having the above-described numbers of cylinders.

The above method provides the two phases of the conventional scavenging operating mode, in which in a first phase the exhaust valves open and the rich exhaust gas flows via partial exhaust ducts into the common exhaust duct, which has been filled with fresh air by the previous cycle as a result of the scavenging operation. In a following second phase, the intake valves open and fresh air flows into the cylinder and into the partial exhaust ducts, which are filled with the rich exhaust gas.

In internal combustion engines having a plurality of exhaust valves per cylinder, it is now proposed to open the exhaust valves in a time-delayed manner, so that fresh air is held back in one of the partial exhaust ducts and is not ejected into the common exhaust duct until, after being combined, the fresh air and sub-stoichiometric combustion exhaust gas were already introduced into the common exhaust duct after the opening of the first exhaust valve. For the held-back fresh air portion in the second partial exhaust duct, the mixing thus takes place not at the exhaust valve itself, but also at the junction of the two partial exhaust ducts to the common exhaust duct.

A further advantage of the phase-shifted opening of the exhaust valves results due to the strongly non-homogenous speed profile of the gases at the junction of the partial exhaust ducts. Thus, large-scale turbulences and a strong swirl flow are generated in an exhaust gas manifold pipe situated after the junction. The increased rate of post-reactions in connection with the swirl flow results in an additional homogenization in the junction of the exhaust gas manifold pipes of the individual cylinders before the turbine of the charge device.

A further advantage of the above method is an improvement of the mixing independent of installed parts or manifold geometry, so that for various engine types the exhaust gas enthalpy is increased due to the increased rate of post-reactions, so that this enthalpy can be made more useful. In this way, the scavenging operation mode can be expanded, and problems with transient load buildup can thus be solved more easily.

According to a first aspect of the present invention, a method is provided for operating an internal combustion engine having at least one cylinder, the cylinder having a first and a second exhaust valve, the internal combustion engine being capable of being operated in scavenging operating mode in that the closing times of the exhaust valves after an exhaust stroke of a four-stroke operating cycle are situated after an opening time of an intake valve, such that in scavenging operating mode the second exhaust valve is opened with a time delay relative to the first exhaust valve.

In addition, a second intake valve can be opened with a time delay relative to a first intake valve before an intake stroke of the four-stroke operating cycle.

According to a specific embodiment, in the scavenging operating mode the second exhaust valve can be closed with a time delay relative to the first exhaust valve.

The region of overlap of the closing of the exhaust valves and the opening of the intake valve can be between 20 and 80° of crankshaft angle.

According to a further aspect of the present invention, a device is provided for operating an internal combustion engine having at least one cylinder, the cylinder having at least one first and one second exhaust valve, the internal combustion engine being capable of being operated in scavenging operating mode in that the closing times of the exhaust valves after an exhaust stroke of a four-stroke operating cycle are situated after an opening time of an intake valve, the device being fashioned so as to open the second exhaust valve with a time delay relative to the first exhaust valve in scavenging operating mode.

According to a further aspect of the present invention, an engine system is provided having an internal combustion engine and the above device.

It can be provided that the internal combustion engine is fashioned as a spark-ignition engine having direct fuel injection.

In addition, the internal combustion engine can have at least one cylinder from which combustion exhaust gases can be ejected via a first and a second exhaust valve into partial exhaust ducts allocated to the exhaust valves, fresh air being capable of being supplied into the cylinders through an intake valve, the internal combustion engine being capable of being operated in scavenging operating mode in that the closing times of the exhaust valves after an exhaust stroke of a four-stroke operating cycle are situated after an opening time of the intake valve.

The partial exhaust ducts can open into a cylinder exhaust duct in a junction region, the volume of the partial exhaust duct allocated to the first exhaust valve and/or the volume of the partial exhaust duct allocated to the second exhaust valve corresponding to 0.05 to 1 times the displacement volume of the cylinder.

In addition, the partial exhaust ducts can open into a cylinder exhaust duct in a junction region, the volume of the partial exhaust duct allocated to the first exhaust valve being determined such that during the time period in which only the first exhaust valve is open, combustion exhaust gas moves into the cylinder exhaust duct.

DETAILED DESCRIPTION OF THE INVENTION

Figure 1:
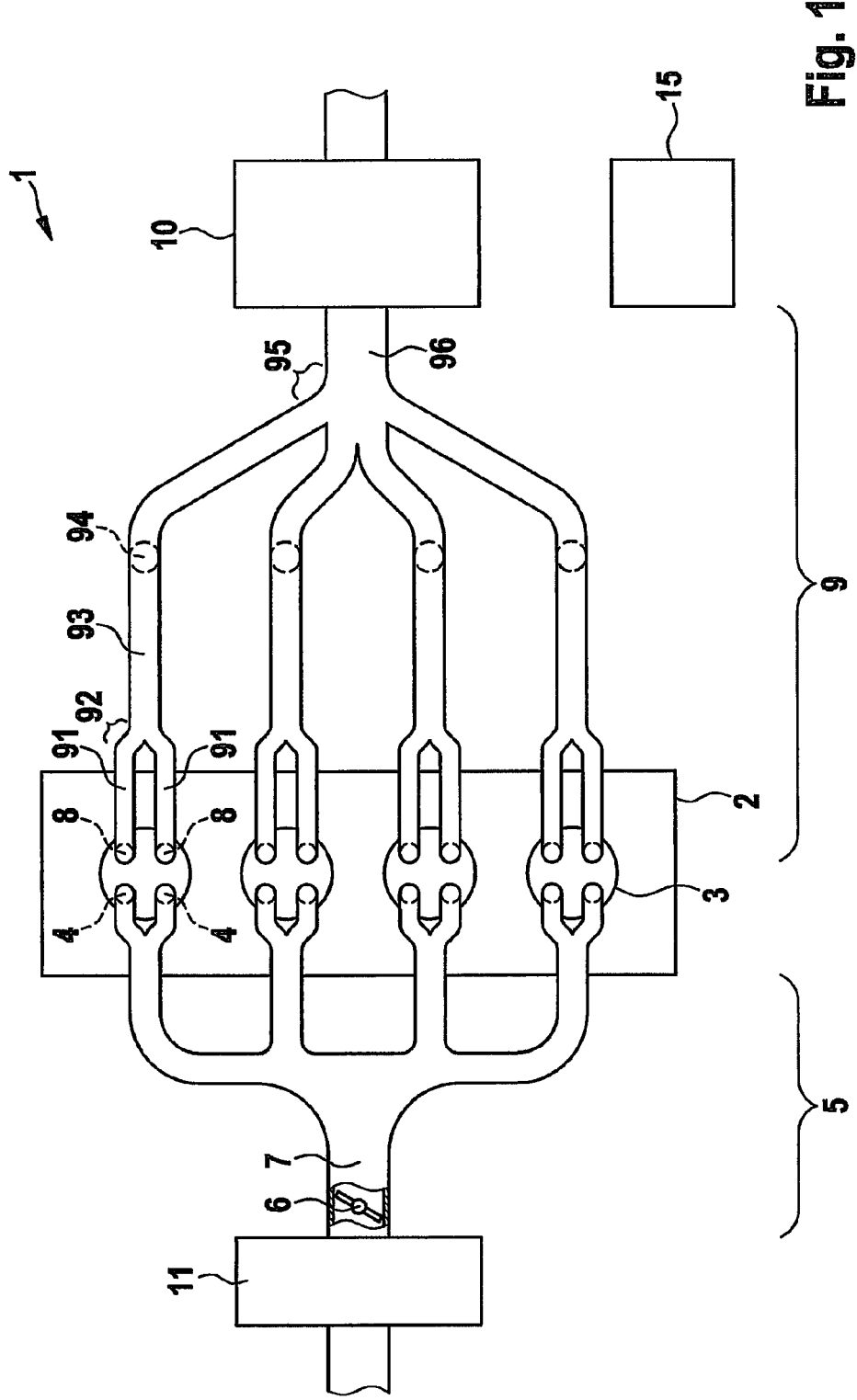
FIG. 1 shows a schematic representation of an engine system having an internal combustion engine.

FIG. 1 shows a schematic representation of an engine system 1 having an internal combustion engine 2 which in the depicted exemplary embodiment has four cylinders 3. The internal combustion engine is for example a spark-ignition engine. Cylinders 3 each have two intake valves 4 connected to an air supply system 5. Via air supply system 5, fresh air can be supplied to intake valves 4, which, corresponding to their controlling, admit the fresh air into a combustion chamber of the corresponding cylinder 3 as a function of the respective working stroke of cylinder 3.

Fuel is preferably supplied to cylinders 3 directly, via a corresponding injection valve (not shown). The air supply is set in air supply system 5 via a throttle valve 6, the position of throttle valve 6 specifying an intake pipe pressure in intake pipe segment 7. The intake pipe pressure determines the quantity of fresh air that flows or is suctioned into the combustion chamber of cylinder 3 when the corresponding intake valves 4 of relevant cylinder 3 are opened.

Cylinders 3 are in addition provided with exhaust valves 8 that are connected to an exhaust gas evacuation system 9. Via exhaust gas evacuation system 9, combustion exhaust gases are conducted away, and a turbine 10 of an exhaust gas turbocharger can be provided downstream from exhaust gas evacuation system 9. Turbine 10 of the exhaust gas turbocharger is used to convert the exhaust gas enthalpy into kinetic energy in order to drive a compressor 11 upstream from throttle valve 6 in air supply system 5.

Exhaust gas evacuation system 9 includes partial exhaust ducts 91 that are situated between the respective exhaust valve 8 and a junction region 92 in which each of the partial exhaust ducts 91 of a cylinder 3 are joined. Downstream from junction region 92 there is provided a cylinder exhaust gas guide 93 that has an exhaust duct manifold 94 indicated by a circle. Cylinder exhaust gas guides 93 of each of cylinders 3 are joined, in a further junction region 95, to form a common exhaust duct 96 that opens into turbine 10. It is also possible for the exhaust gas manifold to have partial exhaust ducts and for the joining not to take place until the exhaust gas duct manifold.

Figure 2:
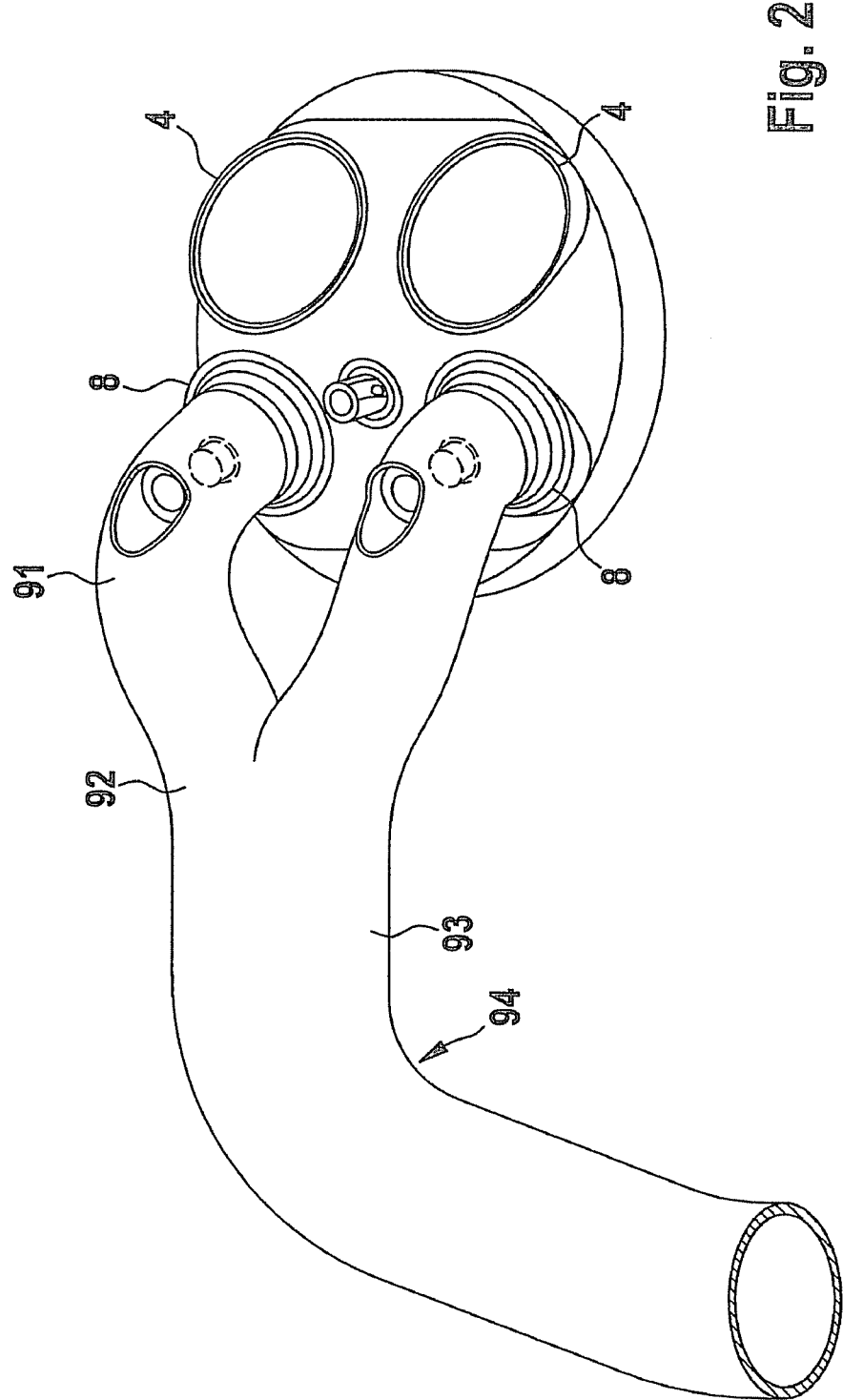
FIG. 2 shows a perspective representation of a cylinder of the internal combustion engine of FIG. 1 with partial exhaust ducts and a cylinder exhaust duct.

FIG. 2 shows a more detailed representation of a cylinder head of one of cylinders 3 having intake valves 4 and exhaust valves 8, which open into exhaust gas guide 93 via partial exhaust ducts 91 and junction region 92.

A control unit 15 is provided that variably controls the opening and closing of intake valves 4 and exhaust valves 8. Alternatively, intake valves 4 and exhaust valves 8 can also be set by an adjustable camshaft (not shown). In addition, control unit 15 controls throttle valve 6 and the conveyor capacity of the exhaust gas turbocharger, in particular of its compressor 11. The capacity of the exhaust gas turbocharger is set via a waste gate, a variable turbine geometry of turbine 10, or the like.

One way of increasing the performance of internal combustion engine 2 is to use a scavenging operating mode. Scavenging is understood as a mode of operation of an internal combustion engine in which the opening times of the intake valve and exhaust valve partially overlap. Due to this, a part of the suctioned fresh air flushes the combustion exhaust gas in the cylinder into the exhaust manifold, significantly improving the filling compared to conventional operation. In addition, scavenging operation increases the exhaust gas enthalpy provided to turbine 10 via the exhaust gas, in order in this way to achieve a higher charge pressure of the fresh air. More specifically, in scavenging operating mode this is achieved in that during a four-stroke operating cycle of the spark-ignition engine, the opening times of exhaust valves 8 during an eject stroke and the opening times of intake valves 4 during a subsequent intake stroke of a particular cylinder 3 overlap, so that during a time window around a top dead center point of a piston in the relevant cylinder 3, fresh air, or an air/fuel mixture, is conducted through the combustion chamber of the relevant cylinder 3 without combusting, and thus moves directly from air supply system 5 into exhaust evacuation system 9.

The increased mass flow in exhaust evacuation segment 9 improves the response characteristic of the turbocharger, in particular at low rotational speeds. In addition, the high oxygen content promotes post-combustion of the exhaust gases. Scavenging thus also contributes to avoiding the so-called "turbo lag."

The exhaust gas enthalpy is increased in that the combustion is carried out in such a way that uncombusted fuel remains in the exhaust gas. This can be achieved by providing a too-rich (sub-stoichiometric) air/fuel mixture in the combustion chamber of cylinders 3. Through scavenging operation, fresh air flows into exhaust gas evacuation system 9, so that this air can mix with the fuel present there, and releases heat in an exothermic reaction. It is desirable for the reaction heat to arise before turbine 10 in order in this way to make it possible to use the exhaust gas enthalpy to drive compressor 11. A precondition of a reaction of the uncombusted fuel with the air oxygen introduced into exhaust gas evacuation system 9 is an adequate mixing of the rich combustion exhaust gas and the fresh air.

Through the scavenging operation, in exhaust gas evacuation segment 9 there arise alternating regions of exhaust gas containing uncombusted fuel and fresh air conducted through the combustion chamber of cylinders 3 during the overlapping opening times, the mixing of the rich combustion exhaust gas and the fresh air taking place only to a limited extent, namely at the locations of transition between the regions.

In order to achieve a better mixing together of the rich combustion exhaust gas and the fresh air conducted through cylinders 3, in scavenging operation an offset controlling of exhaust valves 8 is now provided at each of cylinders 3. That is, during an ejection stroke first a first exhaust valve 8 is opened, while another, second exhaust valve 8 on the same cylinder 3 remains closed. In this way, combustion exhaust gas is conveyed through first exhaust valve 8 through the associated partial exhaust duct 91 into junction region 92, thus pushing the fresh air situated in first partial exhaust duct 91, which was conducted through the relevant cylinder just before the previous closing of exhaust valves 8, into cylinder exhaust gas guide 93. Second exhaust valve 8 is held closed until the fresh air pushed out of first partial exhaust duct 91 into exhaust guide 93 follows a column of combustion exhaust gas into exhaust gas guide 93. Second exhaust valve 8 is then opened, and the fresh air situated in the second partial exhaust duct is pressed into exhaust gas guide 93 by the combustion exhaust gas still situated in cylinder 3.

Instead of the two regions, of fresh air and (rich) combustion exhaust gas, achieved when there is a simultaneous opening of exhaust valves 8, through the offset opening of exhaust valves 8 one can obtain four successive regions, each having two regions with combustion exhaust gas and two regions with fresh air, which move into cylinder exhaust gas guide 93 in alternating fashion. By opening intake valves 4 during an intake stroke that follows the ejection stroke, it is now possible, while exhaust valves 8 are still open, again to conduct fresh air into partial exhaust ducts 91 and, via junction region 92, into exhaust gas guide 93, before exhaust valves 8 are closed. Fresh air columns are now again situated in partial exhaust ducts 91 for the subsequent ejection stroke.

Figure 3A:
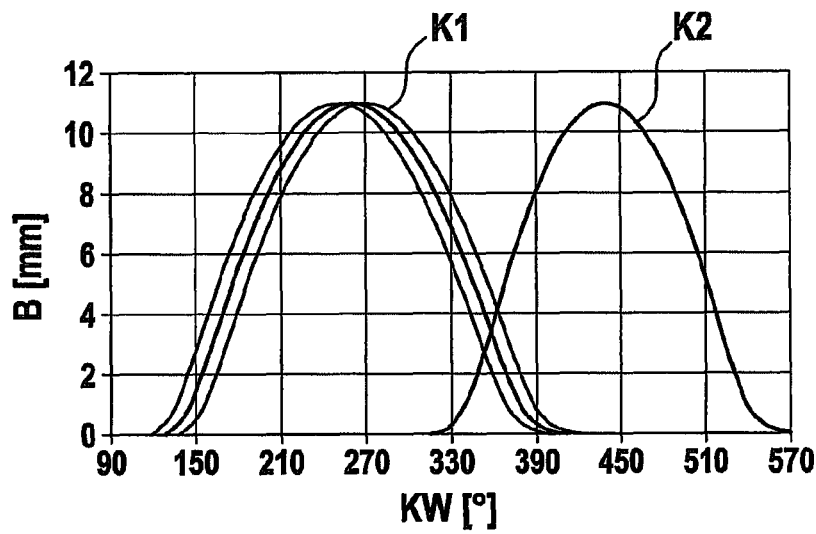
FIGS. 3a and 3b show diagrams representing curves over time of the opening and closing of the intake and exhaust valves of the internal combustion engine of FIG. 1.
Figure 3B:
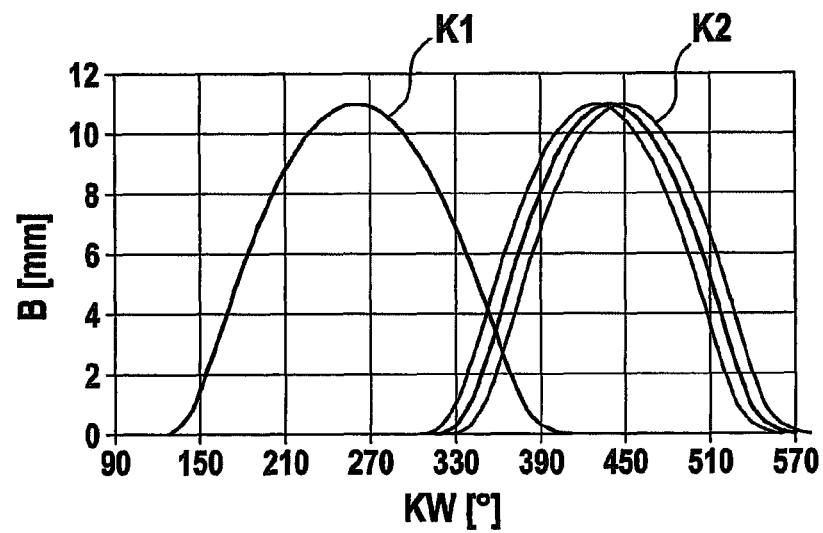

FIGS. 3*a* and 3*b* show diagrams representing the course of the opening and closing of intake valves 4 and of exhaust valves 8. The diagrams show the course of a position B of the valve actuator over the crankshaft angle KW during an ejection stroke and subsequent intake stroke of a cylinder 3. K1 shows the course of position B of the valve actuator of exhaust valves 8, and K2 shows the course of position B of the valve actuator of intake valves 4. FIG. 3*a* shows a temporal offset of the opening and closing of exhaust valves 8 of a cylinder 3 while intake valves 4 of relevant cylinder 3 simultaneously open and close.

FIG. 3*b* shows, as an alternative specific embodiment, that intake valves 4 are opened and closed in temporally offset fashion in order to further improve a mixture of combustion exhaust gas containing fuel with fresh air. A partial mixing can then take place already in the combustion chamber of cylinders 3.

The temporally offset opening and/or closing of intake valves 4 can take place with exhaust valves 8 that are not controlled in offset fashion and with exhaust valves 8 that are controlled in offset fashion, as shown in FIG. 3*a*.

The aim of the offset controlling is to achieve a better mixing in exhaust gas evacuation system 9 by increasing the number of air and combustion exhaust gas columns conveyed through exhaust gas evacuation system 9 into partial exhaust ducts 91, exhaust gas guide 93, and common exhaust duct 96. This results in an improved mixture of the fuel contained in the combustion exhaust gas, or of the rich combustion exhaust gas, with the fresh air brought in by the scavenging operation, in particular at the points at which the regions meet one another.

Various strategies can be used for the controlling of exhaust valves 8. Exhaust valves 8 can be opened in phase-shifted fashion and closed together, i.e. without phase shifting; they can be opened together and closed in phase-shifted fashion; and a phase offset can be provided during the entire opening and closing of exhaust valves 8. Here, a region having fresh air should be present at least in partial exhaust duct 91 allocated to first exhaust valve 8 after the closing of first exhaust valve 8.

In addition, it can be provided to increase the length of partial exhaust ducts 91 so that the mixing zone in the region of first junction region 92 is enlarged. The length of partial exhaust ducts 91 can be selected such that at a specified operating point the quantity of combustion exhaust gas ejected before the opening of second exhaust valve 8 of relevant cylinder 3 is dimensioned such that the fresh air of partial exhaust duct 91 allocated to first exhaust valve 8 and an additional specified quantity of (rich) combustion exhaust gas move into cylinder exhaust gas guide 93.

In particular, the volume of first partial exhaust duct 91 should be selected as a function of the displacement volume of the piston in relevant cylinder 3, and in particular as a function of the change in displacement during the overlapping of the opening times of intake valves 4 and exhaust valves 8. Correspondingly, it can be provided that the volume of partial exhaust ducts 91 is between 0.05 and 1 times a piston displacement of the cylinder. In particular, in conventional spark-ignition engines the length of partial exhaust ducts 91 can be at least 15 cm.

In this way, it can be achieved that during the ejection of the combustion exhaust gas, in a time window between the opening of first exhaust valve 8 and the opening of second exhaust valve 8, the fresh air column in first partial exhaust duct 91 is pushed into cylinder exhaust gas guide 93, and subsequently a further quantity of combustion exhaust gas containing uncombusted fuel is brought into cylinder exhaust gas guide 93. In particular, the volume of first partial exhaust duct 91 should be selected as a function of the piston displacement in the relevant cylinder 3 from top dead center to the time of the opening of second exhaust valve 8.

What is claimed is:

1. A method for operating an internal combustion engine having at least one cylinder including a first intake valve, a second intake valve, a first exhaust valve and a second exhaust valve, comprising:
   selectively operating the internal combustion engine in a scavenging operating mode, wherein, in the scavenging operating mode,. (i) closing times of the first and second exhaust valves after an ejection stroke of a four-stroke operating cycle are situated after an opening time of the first intake valve, (ii) the second exhaust valve is opened with a time delay relative to the first exhaust valve, and (iii) the first and second intake valves are opened before an intake stroke of the four-stroke operating cycle, the second intake valve being opened with a time delay relative to the first intake valve.

2. The method as recited in claim 1, wherein a sub-stoichiometric air/fuel mixture is produced in the cylinder during the scavenging operating mode.

3. The method as recited in claim 1, wherein the second exhaust valve is closed with a time delay relative to the first exhaust valve in the scavenging operating mode.

4. The method as recited in claim 1, wherein an overlap of the closing of the first and second exhaust valves and the opening of the intake valve is between 20° and 80° of crankshaft angle.

5. A control device for operating an internal combustion engine having at least one cylinder including a first intake valve, a second intake valve, a first exhaust valve and a second exhaust valve, comprising:
   a control unit for selectively operating the internal combustion engine in a scavenging operating mode, wherein, in the scavenging operating mode, (i) closing times of the first and second exhaust valves after an ejection stroke of a four-stroke operating cycle are situated after an opening time of the first intake valve, (ii) the second exhaust valve is opened with a time delay relative to the first exhaust valve, and (iii) the first and second intake valves are opened before an intake stroke of the four-stroke operating cycle, the second intake valve being opened with a time delay relative to the first intake valve.

6. An engine system comprising:
   an internal combustion engine having at least one cylinder including a first intake valve, a second intake valve, a first exhaust valve and a second exhaust valve; and
   a control unit for selectively operating the internal combustion engine in a scavenging operating mode, wherein, in the scavenging operating mode, (i) closing times of the first and second exhaust valves after an ejection stroke of a four-stroke operating cycle are situated after an opening time of the first intake valve, (ii) the second exhaust valve is opened with a time delay relative to the first exhaust valve, and (iii) the first and second intake valves are opened before an intake stroke of the four-stroke operating cycle, the second intake valve being opened with a time delay relative to the first intake valve.

7. The engine system as recited in claim 6, wherein the internal combustion engine is a spark-ignition engine having direct fuel injection.

8. The engine system as recited in claim 6, wherein combustion exhaust gases are ejected via the first and second exhaust valves into two partial exhaust ducts allocated to the first and second exhaust valves, and wherein fresh air is supplied into the at least one cylinder through at least one of the first and second intake valves.

9. The engine system as recited in claim 8, wherein the two partial exhaust ducts are connected to a cylinder exhaust gas duct in a junction region, and wherein at least one of the volume of the partial exhaust duct allocated to the first exhaust valve and the volume of the partial exhaust duct allocated to the second exhaust valve corresponds to 5% to 100% of the displacement volume of the cylinder.

10. The engine system as recited in claim 8, wherein the two partial exhaust ducts are connected to a cylinder exhaust gas duct in a junction region, and wherein the volume of the partial exhaust duct allocated to the first exhaust valve is specified in such a way that during a time period in which only the first exhaust valve is open, combustion exhaust gas moves into the cylinder exhaust gas duct.

* * * * *